United States Patent
Nakamura et al.

(10) Patent No.: US 9,921,419 B2
(45) Date of Patent: Mar. 20, 2018

(54) ANNULAR DEVICE (71) Applicants: SEED CO., LTD., Tokyo (JP); SENJU PHARMACEUTICAL CO., LTD., Osaka (JP)

(72) Inventors: Akira Nakamura, Osaka (JP); Tsutomu Fukushima, Osaka (JP)

(73) Assignees: SEED CO., LTD., Tokyo (JP); SENJU PHARMACEUTICAL CO., LTD, Osaka (JP)

( * ) Notice: Subject to any disclaimer, the term of this patent is extended or adjusted under 35 U.S.C. 154(b) by 0 days.

(21) Appl. No.: 14/890,871

(22) PCT Filed: May 29, 2014

(86) PCT No.: PCT/JP2014/064232
§ 371 (c)(1),
(2) Date: Nov. 12, 2015

(87) PCT Pub. No.: WO2014/192853
PCT Pub. Date: Dec. 4, 2014

(65) Prior Publication Data
US 2016/0103336 A1    Apr. 14, 2016

(30) Foreign Application Priority Data
May 30, 2013  (JP) .................................. 2013-113962

(51) Int. Cl.
G02C 7/00  (2006.01)
G02C 7/02  (2006.01)
G02C 7/04  (2006.01)

(52) U.S. Cl.
CPC ............... *G02C 7/048* (2013.01); *G02C 7/04* (2013.01); *G02C 7/047* (2013.01)

(58) Field of Classification Search
CPC .......... G02C 7/04; G02C 7/047; G02C 7/048; A61F 9/0017; A61K 9/0051
(Continued)

(56) References Cited

U.S. PATENT DOCUMENTS 4,484,922 A    11/1984  Rosenwald
5,009,497 A     4/1991  Cohen
(Continued)

FOREIGN PATENT DOCUMENTS

WO    WO1997-024639    7/1997
WO    WO2005-121874   12/2005
WO    WO 2010/092735   8/2010

OTHER PUBLICATIONS

EPOCommunication: extended European Search Report.

*Primary Examiner* — Bumsuk Won
*Assistant Examiner* — Collin X Beatty
(74) *Attorney, Agent, or Firm* — Adam Warwick Bell; Matthew Rupert Kaser (57) ABSTRACT

The object of the present invention is to provide an annular device superior to a conventional annular device in the stability over an eyeball when being worn, which overcomes problems caused by wearing a conventional annular device. The above object is attained by preparing an annular device to be worn over the surface of the sclera, the annular device including an opening exposing the cornea and one or a plurality of approximately encircling grooves on an intermediate part between an inner rim part and an outer rim part. The annular device has a maximum thickness preferably in the intermediate part.

8 Claims, 5 Drawing Sheets

(58) Field of Classification Search
USPC .......................................... 359/159.01–159.81
See application file for complete search history.

(56) References Cited

U.S. PATENT DOCUMENTS

| | | | | |
|---|---|---|---|---|
| 5,120,121 | A * | 6/1992 | Rawlings | B29C 37/0032 |
| | | | | 351/159.24 |
| 9,486,362 | B2 | 11/2016 | Shikamura | |
| 2007/0123814 | A1* | 5/2007 | Roy | A61N 1/0424 |
| | | | | 604/20 |
| 2008/0002149 | A1* | 1/2008 | Fritsch | G02C 7/04 |
| | | | | 351/159.02 |
| 2009/0303432 | A1* | 12/2009 | Suzuki | B29D 11/00125 |
| | | | | 351/159.02 |
| 2010/0137780 | A1* | 6/2010 | Singh | A61B 17/0231 |
| | | | | 604/20 |
| 2012/0022473 | A1* | 1/2012 | Shikamura | A61F 9/04 |
| | | | | 604/300 |
| 2012/0143325 | A1* | 6/2012 | Christie | G02C 7/165 |
| | | | | 623/5.13 |
| 2015/0277147 | A1* | 10/2015 | Kim | G02C 7/04 |
| | | | | 351/159.02 |

* cited by examiner

ated on May 30, 2013.
ANNULAR DEVICE

CROSS-REFERENCE TO RELATED APPLICATION

The present application claims priority from Japanese Patent Application No. 2013-113962 filed on May 30, 2013. The contents of this application are incorporate herein by reference in its entirety.

TECHNICAL FIELD

The present invention relates to an annular device to be worn over the surface of the sclera.

BACKGROUND ART

As a medication method for treating an eye disease, there has been developed a method using a drug delivery system-type contact lens (DDSCL). In such a method, the DDSCL contains a drug and, when being worn, gives controlled release of the drug to an ocular tissue. Since a DDSCL can cover the whole surface of an eye, this method has been understood to be able to deliver a drug at an effective concentration to a tissue in the anterior eye segment such as the cornea and the aqueous humor and to a tissue in the exterior eye segment such as the conjunctiva and tear.

Such a method using a DDSCL, however, is difficult to deliver a drug selectively to a tissue in the posterior eye segment such as the retina, the choroid, the sclera and the vitreous, which are located posterior to the crystalline lens. Given this, there is disclosed a method using an annular (ring-shaped) device having an opening in its center to deliver an ophthalmic drug efficiently to a tissue in the posterior eye segment (see Patent Document 1 below, contents of this document are incorporated herein by reference in its entirety).

PRIOR ART DOCUMENT

Patent Document

Patent Document 1: International Publication WO2010/092735

DISCLOSURE OF THE INVENTION

Problems to be Solved by the Invention

According to Patent Document 1, an annular device of an invention described therein can deliver a drug efficiently to a tissue in the posterior eye segment. The present inventors revealed, however, that the annular device described in Patent Document 1 is not sufficiently stable (i.e., has insufficient capability of staying still) over an eyeball when being worn, which means that this annular device still has a problem in that its stability needs to be improved. Notably, in the case where a wearer wears a contact lens that is not sufficiently stable over an eyeball, the wearer will have a foreign body sensation, and further, will be at a risk of severe eye damages such as injury of the retina. Further, since the annular device described in Patent Document 1 moves over an eyeball, this annular device has a newly recognized problem in that this annular device cannot release a drug efficiently to a tissue in the posterior eye segment.

Given that the annular device described in Patent Document 1 has insufficient stability over an eyeball when being worn, the present invention is made to provide a device that can solve the above-mentioned problems caused by wearing the above conventional device, that is, to provide an annular device that is superior to the above conventional art in its stability over an eyeball when being worn.

Means of Solving the Problems

The present inventors have earnestly investigated how to improve the stability of a contact lens over an eyeball when the lens is being worn. In the first place, the present inventors investigated ways to decrease the radius of curvature of the base curve of a contact lens. The present inventors decreased the radius of curvature of the base curve of an annular device described in Patent Document 1, and the resulting device was worn. Even though a certain improvement in the stability was observed, the resulting device had insufficient stability over an eyeball. Next, the present inventors increased the diameter of an annular device, because it was presumed that an annular device having the center of gravity over the posterior eye segment would be stable over an eyeball when being worn. Such a device with a large diameter, however, had increased foreign body sensation. Thus, it was revealed that a device with a large diameter serves no practical purpose.

The present inventors did a further investigation and have found that an annular device in which an approximately encircling groove is formed on the back surface (i.e., the side facing an ocular tissue) of an intermediate part between an outer rim part and an inner rim part is more stable over an eyeball when being worn than the annular device described in Patent Document 1. The present invention is one made based on the findings described above.

According to the present invention, there is provided an annular device to be worn over the surface of the sclera, the annular device comprising an opening exposing the cornea and one or a plurality of approximately encircling grooves on the back surface of an intermediate part between an outer rim part and an inner rim part.

Preferably, the annular device of the present invention comprises two approximately encircling grooves described above.

Preferably, the annular device of the present invention comprises three approximately encircling grooves described above.

Preferably, the annular device of the present invention has a maximum thickness in the intermediate part.

Effects of the Invention

Since the annular device of the present invention is constituted to comprise one or a plurality of approximately encircling grooves on the back surface of an intermediate part between an outer rim part and an inner rim part, the annular device of the preset invention has decreased mobility over an eyeball when being worn. Thus, foreign body sensation and a risk of causing eye damages are smaller in the case of wearing the annular device of the present invention than the case of wearing the device of the conventional art. In addition, in the case where the annular device is used for the purpose of controlled release of a drug, the drug can be released in a controlled manner and delivered efficiently to a region of interest.

MODE FOR CARRYING OUT THE INVENTION

Hereinafter, the present invention will be described in detail.

The annular device of the present invention is a device to be worn over the surface of the sclera, and comprises an opening that exposes the cornea and one or a plurality of approximately encircling grooves on the back surface of an intermediate part between an outer rim part and an inner rim part.

When the annular device of the present invention is being worn, blinking generates eyelid pressure, and the eyelid pressure generates negative pressure at the approximately encircling groove on the back surface of the intermediate part of the annular device. This negative pressure decreases the mobility of the annular device over the sclera. Therefore, the annular device of the present invention has an enhanced stability (i.e., holding) over an eyeball when being worn. The approximately encircling groove is not limited as long as the approximately encircling groove is any one where negative pressure is generated when the annular device is being worn. The number of the approximately encircling grooves may be one or more than one. The larger number of the approximately encircling grooves provides larger stability to the worn annular device.

[Structure of Annular Device]

In the present invention, in the case where the annular device of the present invention is being worn over the surface of the sclera, the "back surface" is one surface of the annular device that faces the surface of the sclera. In the case, the other surface of the annular device of the present invention does not face the surface of the sclera but faces the inner surface of an eyelid and contacts with the air, and is referred to as a front surface.

In the present invention, the "approximately encircling groove" is formed to travel in a circumferential direction (this direction is also referred to as an encircling direction) in the annular device. The shape of the approximately encircling groove is not particularly limited. Thus, the approximately encircling groove can be a closed circular groove formed to travel entirely in the encircling direction; and a groove formed to travel partially or intermittently in the encircling direction. Alternatively, the approximately encircling groove can be formed in a wavy shape to travel in the encircling direction. The shape of the section of the approximately encircling groove can be, for example, semicircle or polygons such as triangle and quadrangle, and semicircle is preferred.

In the present invention, "a plurality of" means two or more than two, preferably "several", and more preferably one, two, three, four or five. It may be possible, however, that the increase of the number of the approximately encircling grooves is problematic in view of the strength of the device. Thus, the number of the approximately encircling grooves on the annular device of the present invention is preferably two or three. Hereinafter, embodiments of the present invention will be described referring mainly to the annular devices comprising one, two or three approximately encircling grooves, but the present invention is not limited to these.

Figure 1:
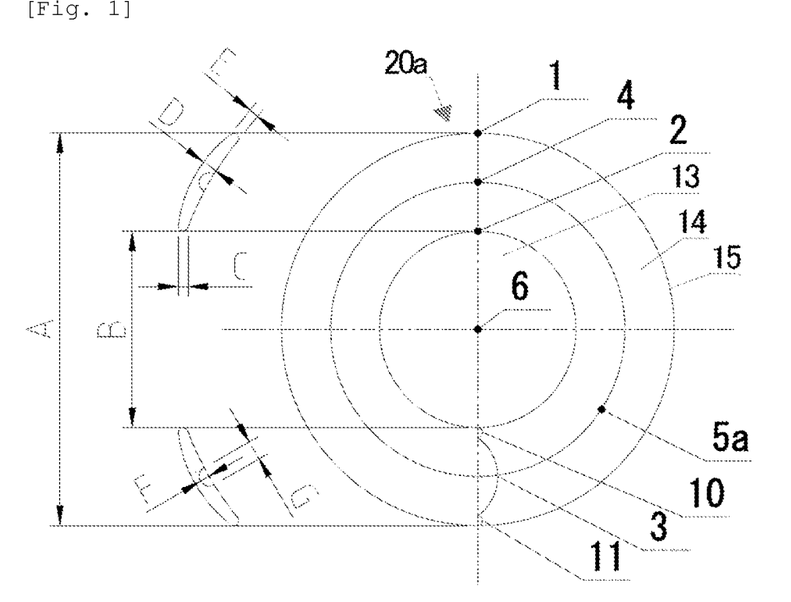
FIG. 1 is a diagram showing a plan view and a sectional view of an annular device comprising one approximately encircling groove around the middle of the intermediate part in the radial direction according to an embodiment of the present invention.
Figure 2:
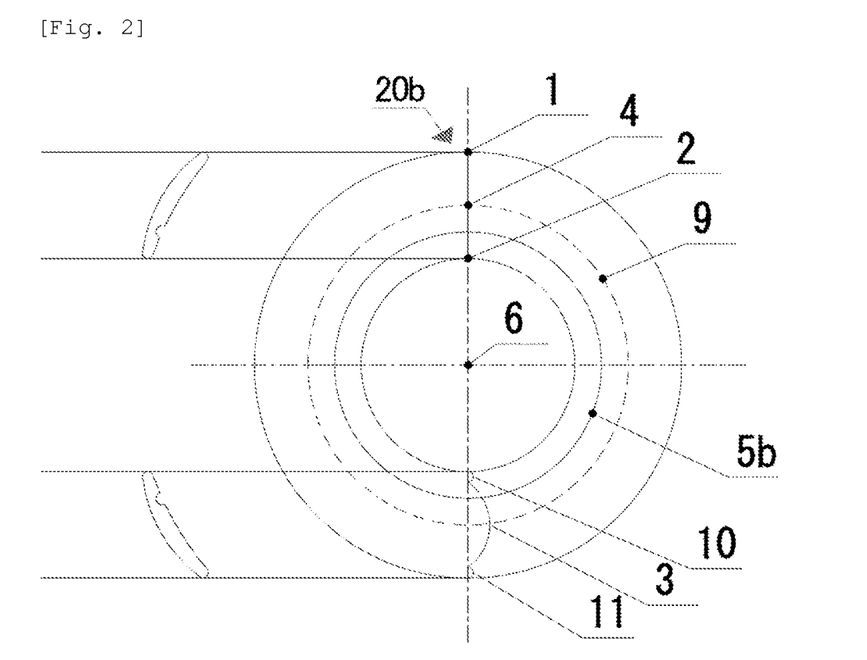
FIG. 2 is a diagram showing a plan view and a sectional view of an annular device comprising one approximately encircling groove between the middle of the intermediate part in the radial direction and the inner rim part according to an embodiment of the present invention.
Figure 3:
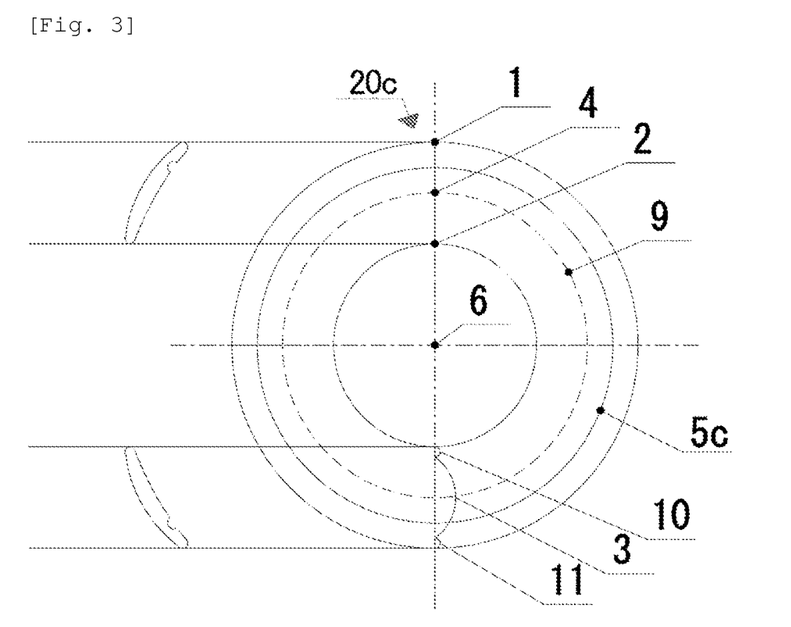
FIG. 3 is a diagram showing a plan view and a sectional view of an annular device comprising one approximately encircling groove between the middle of the intermediate part in the radial direction and the outer rim part according to an embodiment of the present invention.

FIGS. 1 to 3 show plan views and sectional views of the annular devices 20a to 20c of the present invention, respectively. Each of these devices comprises one approximately encircling groove in the intermediate part. The main component of the annular device of the present invention is comprised of a curving thin piece 14 having a completely penetrating opening 13 that exposes the cornea, as shown in FIG. 1 as an embodiment of the present invention.

The plan shape of the annular device of the present invention, i.e., the shape of the outer periphery 15 which defines the outer edge of the curving thin piece, is not particularly limited, but is preferably substantially round so that the annular device can cover approximately the whole surface of the sclera in an equal manner. Alternatively, the plan shape of the annular device can also be ellipse or oval, or approximately round shape with a wave line, zigzag line and/or straight line as a part, as long as the easiness and sensation of wearing an annular device with such a shape is not so much different from those of the substantially round annular device, and the shape of the outer edge of the curving thin piece is in approximately round shape.

The size of the main component of the annular device of the present invention is not particularly limited as long as the annular device is not difficult to wear and is able to cover the surface of the sclera. The outer diameter A ranges preferably from about 16 to about 20 mm, and more preferably from about 18 to about 20 mm in view of easiness of insertion and wearing of the annular device over an eyeball as well as coverage over the surface of the sclera. The inner diameter B (i.e., the diameter of the opening) ranges preferably from about 10 to about 15 mm in order to prevent the inner rim part of the annular device from touching the cornea.

The inner rim part 10 is a part traveling on and along the inner periphery by the side of the opening of the annular device. The inner rim part 10 has a width ranging from 0.3 to 0.5 mm from the inner periphery point 2 in the radial direction. The outer rim part 11 is a part traveling on and along the outer periphery of the annular device and has a width ranging from 0.3 to 0.5 mm from the outer periphery point 1 in the radial direction. The intermediate part 3 is the part other than the inner rim part 10 and the outer rim part 11 in the annular device. In the annular device of the present invention, the inner periphery point 2 can be any point on the inner periphery, and the outer periphery point 1 can be any point on the outer periphery.

The annular device 20a shown in FIG. 1 comprises, on the intermediate part 3, one approximately encircling groove 5a which is formed in the encircling direction so as to pass through the midpoint 4, the midpoint 4 being at the middle of the straight line drawn from the outer periphery point 1 to the inner periphery point 2. The annular device 20b shown in FIG. 2 comprises one approximately encircling groove 5b which is formed in the encircling direction and between the midpoint 4 and the inner rim part 10. The annular device 20c shown in FIG. 3 comprises one approximately encircling groove 5c which is formed in the encircling direction and between the midpoint 4 and the outer rim part 11. An imaginary circle 9 shown in FIGS. 2 and 3 is a non-existing circle formed in the encircling direction so as to pass through the midpoint 4 and does not actually exist on the annular device of the present invention.

The depth F of the approximately encircling groove is not particularly limited. For example, the depth F of the approximately encircling groove can range from 1 to 90%, and preferably from 5 to 50% of the thickness D of the intermediate part. In the case where the depth F of the approximately encircling groove is less than 1% of the thickness D of the intermediate part, the negative pressure may be insufficiently generated and thus the annular device of the present invention with such a depth may not be stably held over an eyeball. On the other hand, in the case where the depth F of the approximately encircling groove is more than 90% of the thickness D of the intermediate part, such an annular device is prone to have low shape-holding capability and thus is not preferred.

The width G of the approximately encircling groove ranges preferably from 1 to 50% of the width in the radial direction of the intermediate part 3 on which the approximately encircling groove is formed. In the case where the width G of the approximately encircling groove is less than 1% of the width in the radial direction of the intermediate part 3, the negative pressure may be insufficiently generated and thus the annular device of the present invention with such a width may not be stably held over an eyeball. On the other hand, in the case where the width G of the approximately encircling groove is more than 50% of the width in the radial direction of the intermediate part 3, such an annular device is prone to have low shape-holding capability and thus is not preferred.

Figure 4:
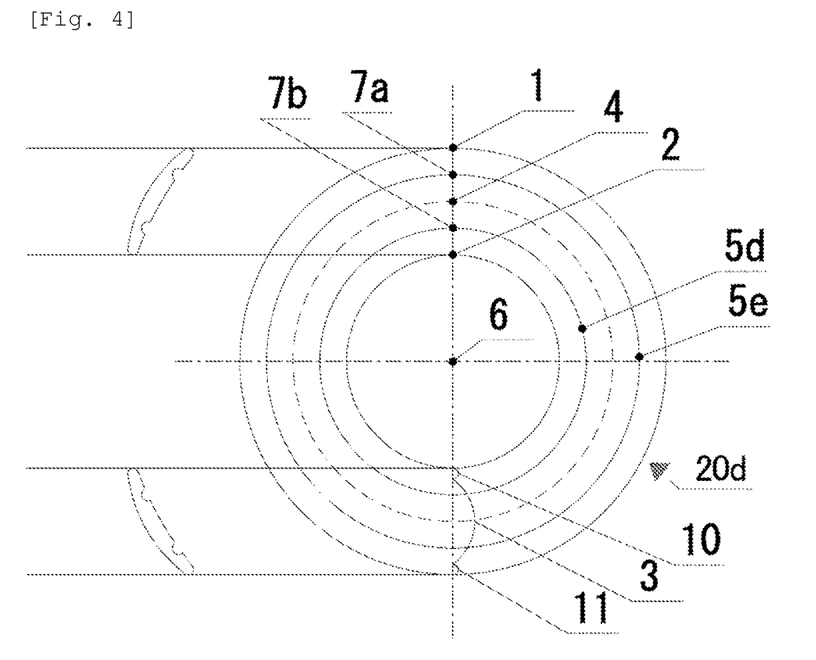
FIG. 4 is a diagram showing a plan view and a sectional view of an annular device comprising one approximately encircling groove between the middle of the intermediate part in the radial direction and the inner rim part and one approximately encircling groove between the middle of the intermediate part in the radial direction and the outer rim part, according to an embodiment of the present invention.
Figure 5:
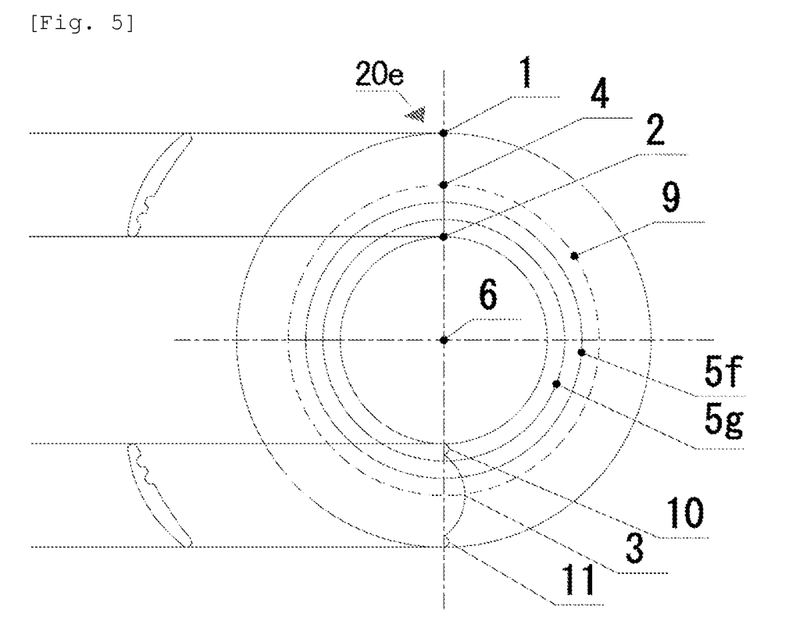
FIG. 5 is a diagram showing a plan view and a sectional view of an annular device comprising two approximately encircling grooves between the middle of the intermediate part in the radial direction and the inner rim part according to an embodiment of the present invention.
Figure 6:
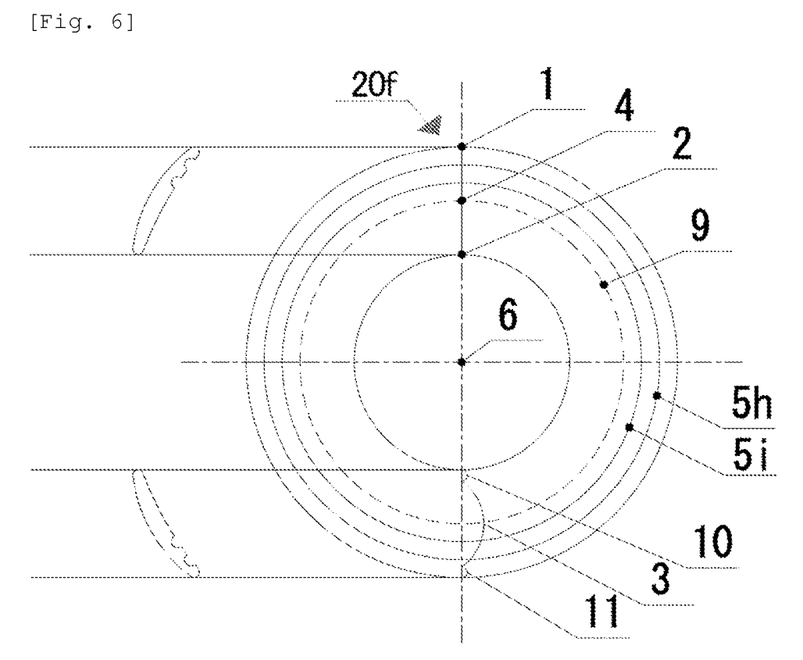
FIG. 6 is a diagram showing a plan view and a sectional view of an annular device comprising two approximately encircling grooves between the middle of the intermediate part in the radial direction and the outer rim part according to an embodiment of the present invention.

FIGS. 4 to 6 shows plan views and sectional views of the annular devices 20d to 20f, respectively. Each of these devices comprises two approximately encircling grooves on the intermediate part. The annular device 20d shown in FIG. 4 comprises two approximately encircling grooves 5e and 5d which are formed in the encircling directions. The approximately encircling groove 5e is formed in the encircling direction so as to pass through the midpoint 7a, the midpoint 7a being at the middle of the straight line drawn from the midpoint 4 to the outer periphery point 1. The approximately encircling groove 5d is formed in the encircling direction so as to pass through the midpoint 7b, the midpoint 7b being at the middle of the straight line drawn from the midpoint 4 to the inner periphery point 2. The annular device 20e shown in FIG. 5 comprises two approximately encircling grooves 5f and 5g which are formed in the encircling directions and between the midpoint 4 and the inner rim part 10. The annular device 20f shown in FIG. 6 comprises two approximately encircling grooves 5h and 5i which are formed in the encircling directions and between the midpoint 4 and the outer rim part 11.

Figure 7:
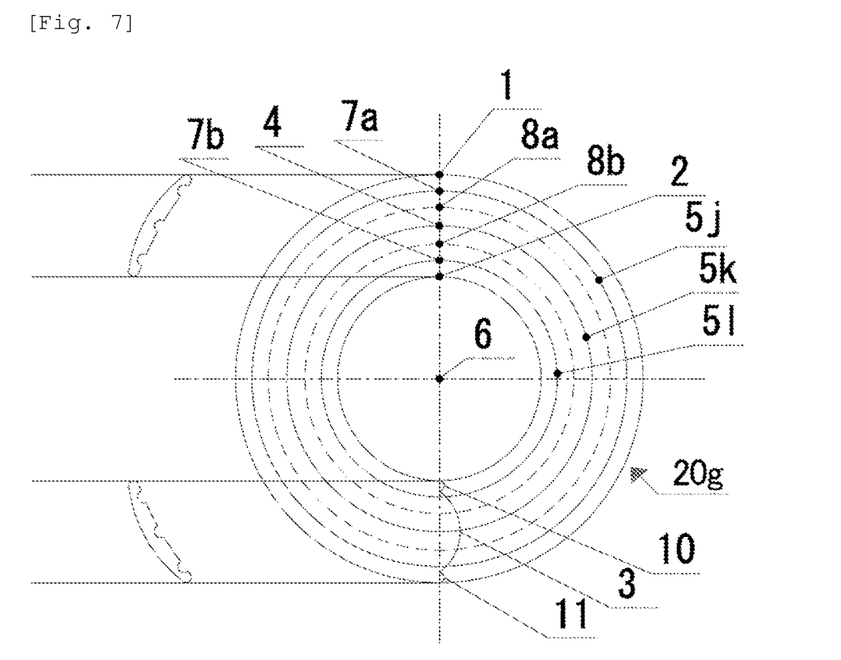
FIG. 7 is a diagram showing a plan view and a sectional view of an annular device comprising one approximately encircling groove around the middle of the intermediate part in the radial direction, one approximately encircling groove between the middle of the intermediate part in the radial direction and the inner rim part, and one approximately encircling groove between the middle of the intermediate part in the radial direction and the outer rim part, according to an embodiment of the present invention.
Figure 8:
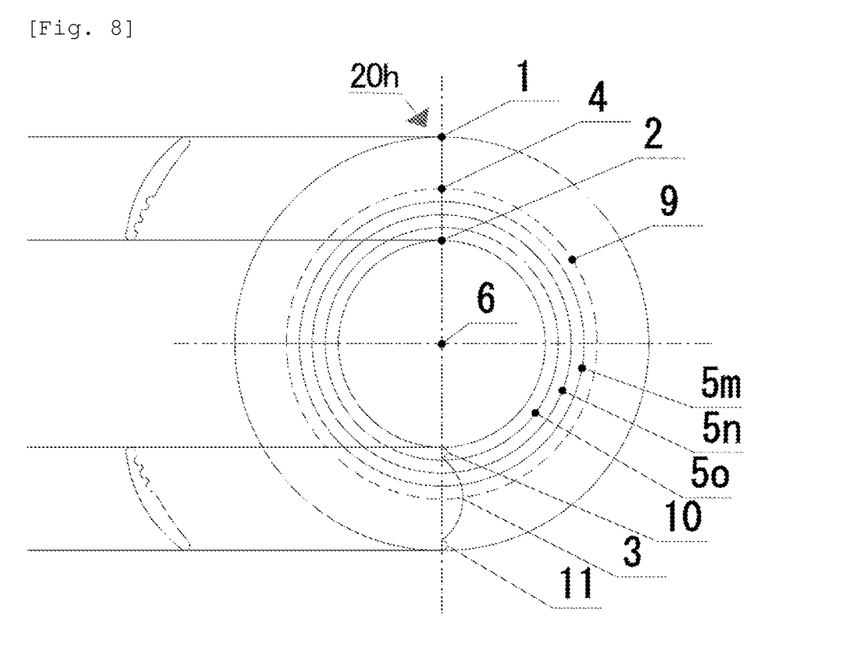
FIG. 8 is a diagram showing a plan view and a sectional view of an annular device comprising three approximately encircling grooves between the middle of the intermediate part in the radial direction and the inner rim part according to an embodiment of the present invention.
Figure 9:
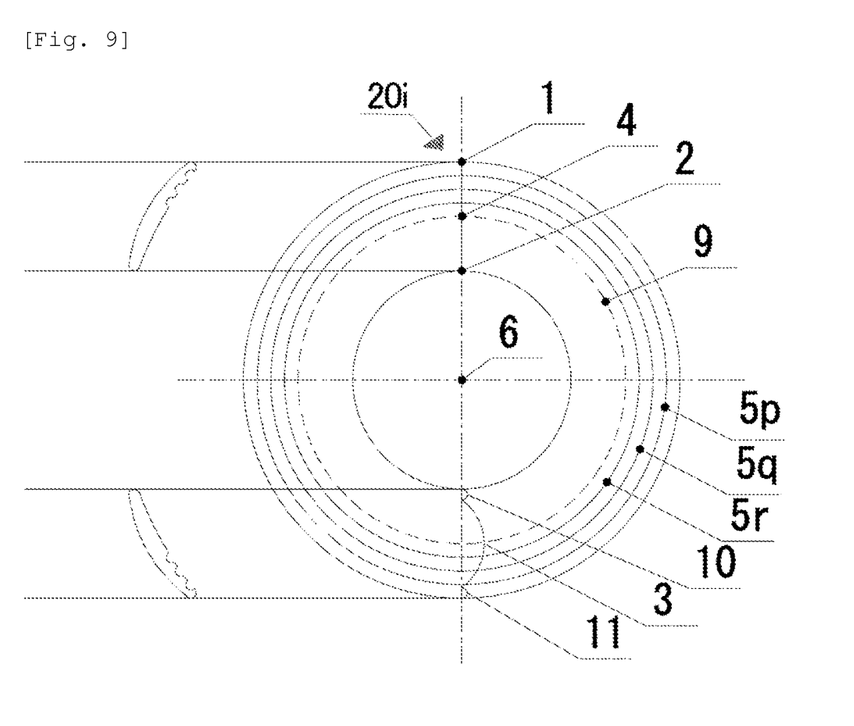
FIG. 9 is a diagram showing a plan view and a sectional view of an annular device comprising three approximately encircling grooves between the middle of the intermediate part in the radial direction and the outer rim part according to an embodiment of the present invention.

FIGS. 7 to 9 shows plan views and sectional views of the annular devices 20g to 20i, respectively. Each of these devices comprises three approximately encircling grooves on the intermediate part. The annular device 20g shown in FIG. 7 comprises three approximately encircling grooves 5k, 5j and 5l in the encircling directions. The grove 5k is formed in the encircling direction so as to pass through the midpoint 4. The approximately encircling groove 5j is formed in the encircling direction so as to pass through the midpoint 7a on the intermediate part 3, the midpoint 7a being at the middle of the straight line drawn from the outer periphery point 1 to a trisection point 8a of the straight line drawn from the outer periphery point 1 and the inner periphery point 2. The approximately encircling groove 5l is formed in the encircling direction so as to pass through the midpoint 7b, the midpoint 7b being at the middle of the straight line drawn from the other trisection point 8b to the inner periphery point 2. The annular device 20h shown in FIG. 8 comprises three approximately encircling grooves 5m, 5n and 5o which are formed in the encircling directions and between the midpoint 4 and the inner rim part 10. The annular device 20i shown in FIG. 9 comprises three approximately encircling grooves 5p, 5q and 5r which are formed in the encircling directions and between the midpoint 4 and the outer rim part 11.

In the case where the annular device of the present invention comprises two or more than two approximately encircling grooves, the distance between two adjacent approximately encircling grooves is not particularly limited, and for example, can be 0.5 times or more than 0.5 times of the smallest width among the widths of the approximately encircling grooves.

From the comparison of the devises shown in FIGS. 1 to 3, FIGS. 4 to 6 and FIGS. 7 to 9, the more increase of the number of the approximately encircling grooves is found to lead to the larger negative pressure generated upon blinking when the annular device of the present invention is being worn. Thus, this increase makes the annular device of the present invention easier to be held over a desired position and thus improves the annular device's stability over an eyeball.

The shape, the position, the number and the like of the approximately encircling groove of the present invention is not limited to those of the approximately encircling grooves shown in FIGS. 1 to 9. Examples of the annular device of the present invention also include an annular device comprising two or three approximately encircling grooves only around the outer rim part 11 and the inner rim part 10, and an annular device comprising one approximately encircling groove formed in the encircling direction so as to pass through the midpoint 4 as well as one or two approximately encircling grooves formed in the encircling directions around the outer rim part 11 and/or the inner rim part 10. Of course, it is obvious that an annular device comprising four or more than four approximately encircling grooves is also encompassed by the present invention.

It is preferred that the annular device of the present invention has a maximum thickness in the intermediate part 3 between the inner rim part 10 and the outer rim part 11 in view of sensation of wearing the device over an eye and the stability over the eyeball. In the present invention, "the annular device has a maximum thickness in the intermediate part" means that a part or the whole of the intermediate part 3 is the thickest in the annular device.

In the annular device of the present invention, the thickness C of the inner rim part ranges, for example, from about 0.05 to about 0.3 mm, and the thickness E of the outer rim part ranges, for example, from about 0.05 to about 0.3 mm. The thickness D of the intermediate part can ranges, for example, from about 0.08 to about 0.4 mm, and is preferably 0.03 mm or more than 0.03 mm thicker than both of the thickness C of the inner rim part and the thickness E of the outer rim part. Typically, as show in FIG. 1, the thickness C of the inner rim part increases from the inner periphery point 2 to the midpoint 4, and the thickness E of the outer rim part increases from the outer periphery point 1 to the midpoint 4. The thickness E of the outer rim part can be substantially the same as the thickness C of the inner rim part; however, the thickness E of the outer rim part is preferably larger than the thickness C of the inner rim part to render the center of gravity of the worn annular device of the present invention closer to a tissue in the posterior eye segment. Therefore, preferred relations between the thickness C of the inner rim part, the thickness E of the outer rim part and the thickness D of the intermediate part are the followings:

the thickness D of the intermediate part>the thickness C of the inner rim part=the thickness E of the outer rim part; and the thickness D of the intermediate part>the thickness E of the outer rim part>the thickness C of the inner rim part.

The annular device of the present invention comprises one or a plurality of approximately encircling grooves on the back surface of the intermediate part between the inner rim part and the outer rim part and further is constituted to have a maximum thickness in the intermediate part, thereby allowing the effects of the eyelid pressure generated by blinking to decrease and effectively preventing the annular device from being displaced over an eyeball and falling away from an eye.

The opening 13 of the annular device of the present invention is an area that exposes the cornea. Thus, in the case where the annual device is worn over an eye, the opening 13 is preferably made to be an opening area (a through hole) so that the curving thin piece 14 as the substance of the annular device does not touch the cornea. Preferably, as shown in FIG. 1, the center of the opening 13 is the center 6, i.e., the same as the center of the annular device, and concentric with the annular device; however, the opening 13 is not necessarily concentric with a circle formed around the center 6 as long as the whole shape of the annular device is designed so that the opening 13 lies over the cornea when the annular device is being worn over an eye. The shape of the opening 13 is not particularly limited. As in the case of the outer periphery 15, the opening 13 can be approximately round and preferably is substantially round.

To make it easier to wear the annular device and to ensure that the opening 13 of the worn annular device lies over the cornea, the annular device preferably has a doughnut-like shape wherein the axial center of the opening 13 is identical with the axial center of the outer periphery 15 at the center 6 so as to be concentric with each other, as shown in FIG. 1.

The base curve (BC) of the annular device of the present invention is appropriately determined based on the curvature of the sclera. The base curve ranges, for example, from 8.8 to 13 mm, and preferably from 10 to 12 mm. The annular device of the present invention can further be an embodiment comprising a slit, a notch and/or the like that section the curving thin piece so as to make the annular device easier to, for example, wear and handle.

[Material of Annular Device]

It is preferred that the annular device of the present invention is composed of a hydrogel. Examples of such a hydrogel include: hydrogels prepared in the use of a hydrophilic monomer; and hydrogels prepared by mixing a hydrophilic monomer with either or both of a hydrophobic monomer and a crosslinking monomer.

A hydrophilic monomer contributes to the improvement of water content ratio of a hydrogel. A hydrophobic monomer is used for adjusting water content ratio and swelling ratio of a hydrogel and, in the case where the device contains a drug, can influence properties of controlled release of the contained drug. A crosslinking monomer can be used for regulating the density of polymer chains in a hydrogel depending on the contained amount of the monomer. Thus, a crosslinking monomer can be used for regulating crosslink density to inhibit drug diffusion, delay drug release, and control the rate of drug release. In addition to the control of the rate of drug release, a crosslinking monomer can also provide a hydrogel with improved mechanical strength, shape-holding capability and resistance to a solvent.

The water content ratio in a hydrogel (Water Content Ratio (wt %)=$[(W-D)/W] \times 100$ (W: wet weight, D: dry weight)) is not particularly limited as long as this content is similar to or the same as water content ratio of a commercially-available hydrogel contact lens, and can range from 30 to 70 wt %, for example. In the case where the annular device of the present invention contains a drug, the water content ratio can be appropriately determined depending on the type of drug considering the amount of the drug to be contained and the release behavior of the drug.

The hydrophilic monomer preferably comprises one or a plurality of hydrophilic groups in the molecule. Examples of such a hydrophilic monomer include 2-hydroxyethyl(meth) acrylate, 2-hydroxymethyl(meth)acrylate, hydroxypropyl (meth)acrylate, glycerol(meth)acrylate, acrylamide, N,N-dimethyl(meth)acrylamide, N,N-diethyl(meth)acrylamide, N-vinylpyrrolidone, diacetoneacrylamide, N-vinylacetoamide, (meth)acrylic acid, (meth)acryloxy ethylsuccinate, itaconic acid, methacrylamido propyl triammonium chrolide, and 2,3-dihydroxypropyl(meth)acrylate. Two or more than two of these hydrophilic monomers may be used in combination. Among the above examples of the hydrophilic monomer, 2-hydroxyethyl(meth)acrylate is preferred. The mixing ratio (expressed as a percentage) of the hydrophilic monomer is not particularly limited, but preferably 50 wt % or more than 50 wt % of all monomers to be subjected to the polymerization, considering that the hydrophilic monomer influences water content of the annular device obtained. In the case where the mixing ratio of the hydrophilic monomer is less than 50 wt %, the hydrophilic monomer cannot provide the device with sufficient water content, resulting in low flexibility of the annular device. Thus, the mixing ratio less than 50 wt % is not preferred.

In the case where the annular device contains a drug, the hydrophilic monomer used in preparing the annular device are appropriately selected based on the structure of the drug selected, a period of time for releasing the drug and the amount of the drug to be released. For example, in the case where an ionic drug is selected, selecting a monomer having an ionic group which is a hydrophilic group and to be a counter ion leads to a hydrogel in which the drug can be held to a high degree by virtue of an ionic bond. Since the water content ratio influences properties of drug release, it is preferable for the purpose of regulating the water content ratio to select a monomer with higher hydrophilicity such as monomers having an ionic group in order to obtain a hydrogel with high water content ratio, or select a monomer with slightly lower hydrophilicity such as monomers having a hydroxyl group in order to obtain a hydrogel with low water content ratio.

Examples of the hydrophobic monomer include siloxanyl (meth)acrylate, trifluoroethyl(meth)acrylate, methacrylamide, cyclohexyl(meth)acrylate, and n-butyl(meth)acrylate. Two or more than two of these hydrophobic monomers may be used in combination. The hydrophobic monomer can change the water content of the annular device depending on the mixing ratio of the hydrophobic monomer. In the case where the mixing ratio of the hydrophobic monomer is high, the water content of the annular device significantly decreases, resulting in low flexibility of the annular device. Thus, it is preferred that the mixing ratio of the hydrophobic monomer is, for example, less than 30 wt % of the total amount of the monomers.

In the case where the annular device contains a drug, the hydrophobic monomer used in preparing the annular device are appropriately selected based on the structure of drug selected, a period of time for releasing the drug and the amount of the drug to be released, as in the case of the hydrophilic monomer. For example, in the case where a hydrophobic drug is selected, a hydrophobic monomer is preferably selected so as to enhance compatibility of the hydrophilic monomer with the drug. The water content ratio of the hydrogel obtained can be varied depending on the content of the hydrophobic monomer.

Examples of the crosslinking monomer include ethyleneglycol di(meth)acrylate, methylenebisacrylamide, 2-hydroxy-1,3-dimethacryloxypropane and trimetylolpropane triacrylate. Two or more than two of these crosslinking monomers may be used in combination.

The mixing ratio of the crosslinking monomer ranges preferably from 0.1 to 10 wt % of the total amount of the monomers, in view of the shape-modulating capability of the annular device obtained. In the case where the mixing ratio of the crosslinking monomer is less than 0.1 wt %, the network structure in the annular device is deficient. On the other hand, in the case where the mixing ratio of the crosslinking monomer is more than 10 wt %, the network structure is excessive, which results in a fragile annular device with low flexibility.

A polymerization initiator can be used in polymerizing the mixed monomers explained above. Examples of such a polymerization initiator include typical radial polymerization initiators such as peroxides including lauroyl peroxide, cumene hydroperoxide and benzoyl peroxide, azobisvaleronitrile and azobisisobutyronitrile. The amount of the polymerization initiator to be added ranges preferably from about 10 to about 3,500 ppm of the total amount of the monomers.

The annular device of the present invention can further comprise a UV absorber. Examples of such a UV absorber include 2-hydroxy-4-(meth)acryloyloxybenzophenone, 2-hydroxy-4-(meth)acryloyloxy-5-t-butylbenzophenone, 2-(2'-hydroxy-5'-(meth)acryloyloxyethylphenyl)-2H-benzotriazol, 2-(2'-hydroxy-5'-(meth)acryloyloxyethylphenyl)-5-chrolo-2H-benzotriazol, and 2-hydroxy-4-methacryloyloxymethyl phenylbenzoate. The amount of the UV absorber to be added can be determined based on a desired UV absorbance.

[Drug]

The annular device of the present invention can contain a drug. Such a drug is, for example, a drug that is soluble in a solvent and preferably is a drug for preventing and/or treating a disease in the posterior eye segment.

Examples of such a disease in the posterior eye segment include postoperative infections, diabetic retinopathy, retinal vessel occlusion, retinal pigmentosa, chorioretinopathy, retinal dystrophy, macular dystrophy, macular degeneration, macular edema, retinitis, retinochoroiditis, optic neuritis, optic neuropathy, retinal detachment, optic atrophy and optic nerve avulsion. Examples of a drug for preventing and/or treating diseases of the posterior segment of the eye include antibiotics, steroidal anti-inflammatory agents, non-steroidal anti-inflammatory agents, anti-allergic agents, antiviral agents, antifungal agents, angiogenesis inhibitors, retinal neurite formation accelerators, retinal neuron protectants, optic verve regeneration accelerators and optic nerve protectants.

In the present invention, the method of comprising a drug in the annutar device is not particular limited and can include a known method. Examples of such a method include methods in which the hydrophilic monomer and the hydrophobic monomer, both of which are explained above as the components used in preparing the contact lens, are copolymerized under the presence of a drug; and methods in which a contact lens is immersed in a drug solution before or after the contact lens is shaped. The amount of the drug to be contained in the annular device is appropriately determined based on the type of the drug, a therapeutically effective concentration of the drug, a period of time for releasing the drug and a wearer's conditions. According to the preset invention, the annular device containing a drug is very stable over an eye, and also can prevent development of an eye disease when the device i s being worn and can gradually release the drug contained in the annular device in a controlled manner.

[Method for Preparing Annular Device ]

The annular device of the present invention can be prepared by any known method such as, but not limited to, mold casting and lathe cutting. In mold casting, the monomer components are polymerized in a mold that is designed in advance to form the polymer obtained into a shape of interest (i.e., an annular shape). In lathe cutting, a block of polymer is obtained first, and then the block is cut into the annular device, followed by polishing and what not.

Mold Casting

A liquid monomer mixture is obtained by adding a polymerization initiator to a hydrophilic monomer or to a mixture of a hydrophilic monomer with either or both of a hydrophobic monomer and a crosslinking monomer, followed by stirring and dissolution.

The obtained liquid monomer mixture is poured into a mold made of a metal, glass, plastic or the like. Then the mold is sealed up and heated stepwise or continuously from 25° C. to 130° C. in a thermostatic chamber or the like so that the polymerization terminates within a period ranging from 5 to 120 hours. For the polymerization, ultraviolet rays, electron beams, gamma rays or the like can be used. Alternatively, solution polymerization where water or an organic solvent is added to the liquid monomer mixture can be employed.

After the polymerization terminated, the obtained polymer product is cooled down to room, temperature and taken out of the mold. The resulting product is, if needed, further subjected to cutting and polishing. The obtatained device (i.e., the annular device) is subjected to hydration swelling to make a water-containing gel (i.e., a hydrogel). Examples of a liquid used for hydration swelling (i.e., a swelling solution) include water, normal saline, isotonic buffer and a mixture of one or some of these with a water-soluble organic solvent. In the hydration swelling, the swelling solution is heated to 40 to 100° C., and the annular device is soaked for a certain period of time in the swelling solution to promptly make the annular device in the form of being hydrated and swollen. The swelling treatment allows removal of unreacted monomers from the obtained polymer product.

Lathe Cutting

A block of polymer is obtained in the similar manner as mold casting using a mold that forms the obtained polymer product into a block shape. Then, the obtained block is cut to make a corneo-scleral lens. Subsequently, an opening with a desired size is formed in the obtained corneo-scleral lens, and the periphery of the corneo-scleral lens is polished and smoothed. The annular device is thus obtained. Alternatively, the annular device can be obtained through the way in which the opening is made first and then the block is cut into a device in a lens shape.

[Usage of Annular Device]

The annular device of the present invention is worn over the surface of the sclera, and more specifically, over the bulbar conjunctiva which covers the surface of the sclera. A special assistant tool can be used in wearing the annular device. In the case where the annular device of the present invention is used for the purpose of controlled release of a drug, the dosage of the drug released from the annular device of the present invention depends on the type of the drug, but typically ranges from about 1 µg to about 100 mg per dose. The dose frequency of the drug using the annular device of the present invention can be appropriately determined based on, for example, wearer's conditions and age; for example, the annular device can be worn once or several times per day (for example, once to six times per day) or once in several months or years.

The present invention will hereinafter be described in more detail by referring to Examples. The present invention, however, is not limited to these Examples.

EXAMPLES

[Method for Making Annular Device]

Ninety-nine grams of 2-hydroxyethylmethacrvlate as the hydrophilic monomer, 1 g of ethylene glycol dimicacrylate as the crosslinking monomer and 0.15 g of 2,2'-azobisisobutyronitrile as the polymerization initiator were mixed together. Then, this mixture was subjected to thermal polymerization. (for 40 hours, heated from room temperature to 100° C. under a nitrogen atmosphere) in molds each of which was designed in advance to form the obtained polymer into the structure of either of Examples 1 to 6 and Comparative Example 1 with an outer diameter, inner diameter, thickness and/or groove shown in Table 1. The obtained devices to be swollen were soaked in a normal saline and heated at 60° C. for 30 minutes to swell the devices. Then, the resulting devices were subject to autoclaved sterilization. Annular devices were thus obtained.

The thicknesses of each annular device were measured using DIAL THICKNESS GAUGE (G-1A, OZAKI MFG. CO., LTD). As the thickness of the inner rim part, the thickness of the position 0.3 mm away from the edge of the opening was measured. As the thickness of the outer rim part, the thickness of the position 0.3 mm away from the other edge of the annular device was measured. As the thickness of the intermediate part, the thickness around the middle between the edge at the opening and the edge at the outer periphery of the annular device was measured.

The depth of each encircling groove formed on the annular device was measured using a measuring microscope (MM-400, Nikon Corporation).

The distance of each encircling groove from the inner periphery of the annular device was measured using a measuring microscope (MM-400, Nikon Corporation).

[Evaluation of Sensation of Wearing, and Stability Over Eyeball]

Four subjects each worn the annular devices of Examples 1 to 6 and Comparative Example 1, and evaluated the sensation of wearing each annular device according to the criteria shown below. In addition, the subjects wearing the annular device were observed with a slit lamp microscope (SM-70, TAKAGI SEIKO CO., LTD.) to evaluate the stability of each annular device over the eyeball according to the criteria shown below.

Sensation of Wearing
+: Example was better than Comparative Example
+/−: there was no difference between Example and Comparative Example
−: Comparative Example was better than Example Stability Over Eyeball
+: Example was better than Comparative Example
+/−: there was no difference between Example and Comparative Example
−: Comparative Example was better than Example Table 2 shows results of the evaluations of the sensation of wearing and the stability over an eyeball for Examples 1 to 6 and Comparative Example 1. The sensation of wearing and the stability over an eyeball in using the annular devices of Examples 1 to 6 were all better than those in using the annular device of Comparative Example 1.

TABLE 1

| | Outer diameter A (mm) | Inner diameter B (mm) | Thickness (mm) | | | Groove | | | | | | |
| | | | Inner rim part | Intermediate part | Outer rim part | Number of grooves | Depth | Groove a | | Groove b | | Groove c | |
| | | | | | | | | distance | width | distance | width | distance | width |
|---|---|---|---|---|---|---|---|---|---|---|---|---|---|
| Example 1 | 18 | 13 | 0.10 | 0.25 | 0.15 | 1 | 0.06 | 1.29 | 0.41 | | | | |
| Example 2 | 18 | 13 | 0.10 | 0.25 | 0.15 | 2 | 0.06 | 0.94 | 0.39 | 1.75 | 0.35 | | |
| Example 3 | 18 | 13 | 0.10 | 0.25 | 0.15 | 2 | 0.12 | 0.94 | 0.53 | 1.75 | 0.50 | | |
| Example 4 | 18 | 13 | 0.10 | 0.25 | 0.15 | 3 | 0.06 | 0.66 | 0.44 | 1.28 | 0.42 | 1.91 | 0.40 |

TABLE 1-continued

|  | Outer diameter A (mm) | Inner diameter B (mm) | Thickness (mm) | | | Groove | | | | | | |
|---|---|---|---|---|---|---|---|---|---|---|---|---|
|  |  |  | Inner rim part | Intermediate part | Outer rim part | Number of grooves | Depth | Groove a | | Groove b | | Groove c | |
|  |  |  |  |  |  |  |  | distance | width | distance | width | distance | width |
| Example 5 | 18 | 13 | 0.10 | 0.25 | 0.15 | 3 | 0.05 | 0.37 | 0.26 | 0.71 | 0.32 | 1.16 | 0.31 |
| Example 6 | 18 | 13 | 0.10 | 0.25 | 0.15 | 3 | 0.05 | 1.51 | 0.39 | 1.84 | 0.35 | 2.10 | 0.26 |
| Comparative Example 1 | 18 | 13 | 0.10 | 0.25 | 0.15 |  |  |  |  |  |  |  |  |

TABLE 2

|  | Sensation of Wearing | | | Stability | | |
|---|---|---|---|---|---|---|
|  | + | +/− | − | + | +/− | − |
| Example 1 | 3 | 1 | 0 | 2 | 2 | 0 |
| Example 2 | 3 | 1 | 0 | 4 | 0 | 0 |
| Example 3 | 3 | 1 | 0 | 4 | 0 | 0 |
| Example 4 | 3 | 1 | 0 | 4 | 0 | 0 |
| Example 5 | 3 | 1 | 0 | 4 | 0 | 0 |
| Example 6 | 3 | 1 | 0 | 4 | 0 | 0 |

DESCRIPTION OF REFERENCE SIGNS

A: outer diameter
B: inner diameter
C: thickness of inner rim part
D: thickness of intermediate part
E: thickness of outer rim part
F: depth of approximately encircling groove
G: width of approximately encircling groove
1: outer periphery point
2: inner periphery point
3: intermediate part
4: midpoint
5a to 5r: approximately encircling groove
6: center
7a and 7b: midpoint
8a and 8b: trisection point
9: imaginary circle
10: inner rim part
11: outer rim part
13: opening
14: curving thin piece
15: outer periphery
20a to 20i: annular device

The invention claimed is:

1. An annular device to be worn over a surface of a sclera, comprising:
an outer rim having a first thickness;
a central opening for exposing a cornea defining an inner rim having a second thickness; and
an intermediate part defined between the outer rim and the inner rim wherein the first thickness of the outer rim part is larger than the second thickness of the inner rim part to render a center of gravity of the annular device closer to a tissue in the posterior eye segment such that a drug is delivered efficiently to the posterior eye segment; and further comprising
one or a plurality of closed circular grooves entirely encircling the central opening,
wherein the depth of each groove ranges between 0.02 mm and 0.2 mm, and
wherein each groove is formed on a back surface of the intermediate part of the annular device, whereby a negative pressure is generated in each of the grooves when the annular device is being worn, and
wherein the grooves decrease the mobility of the annular device over the sclera due to the negative pressure generated.

2. The annular device according to claim 1, wherein the grooves are two approximately encircling grooves.

3. The annular device according to claim 1, wherein the grooves are three approximately encircling grooves.

4. The annular device according to claim 1, wherein the annular device has a maximum thickness in the intermediate part.

5. The annular device of claim 1 wherein the opening exposing a cornea has a diameter between 10 mm and 15 mm.

6. The annular device of claim 5, wherein the grooves are two encircling grooves.

7. The annular device of claim 5, wherein the grooves are three encircling grooves.

8. The annular device of claim 5, wherein the annular device has a maximum thickness in the intermediate part.

* * * * *